United States Patent
Koller et al.

(10) Patent No.: US 9,917,841 B1
(45) Date of Patent: Mar. 13, 2018

(54) BRANDING AND IMPROPER OPERATION DETECTION ON A USER EQUIPMENT

(71) Applicant: Sprint Communications Company L.P., Overland Park, KS (US)

(72) Inventors: Gary D. Koller, Overland Park, KS (US); Mark D. Peden, Olathe, KS (US); Raymond E. Reeves, Oviedo, FL (US); Simon Youngs, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 98 days.

(21) Appl. No.: 14/813,527

(22) Filed: Jul. 30, 2015

(51) Int. Cl.
 H04L 12/08 (2006.01)
 H04L 29/06 (2006.01)
 H04W 12/08 (2009.01)

(52) U.S. Cl.
 CPC ........... H04L 63/102 (2013.01); H04W 12/08 (2013.01)

(58) Field of Classification Search
 CPC .................................................. H04L 63/102
 USPC ......................................................... 713/176
 See application file for complete search history.

(56) References Cited

U.S. PATENT DOCUMENTS

| | | | | |
|---|---|---|---|---|
| 6,807,559 B1* | 10/2004 | Budhiraja | ........... | G06F 9/44521 709/203 |
| 7,783,981 B2* | 8/2010 | Tyhurst | ................. | G06F 9/4415 710/10 |
| 8,612,967 B1* | 12/2013 | Delker | ...................... | G06F 8/61 717/169 |
| 8,670,787 B1* | 3/2014 | Todd | ..................... | H04M 15/39 370/328 |
| 9,313,643 B1* | 4/2016 | Ghoshal | ................ | H04W 4/003 709/222 |
| 9,485,624 B2* | 11/2016 | Todd | ..................... | H04M 15/39 709/224 |
| 2002/0116549 A1* | 8/2002 | Raffaele | .................. | G06F 9/468 719/330 |
| 2004/0056890 A1* | 3/2004 | Hao | ....................... | G06F 9/4443 715/744 |
| 2006/0053426 A1 | 3/2006 | Dive-Reclus et al. | | |
| 2007/0232268 A1 | 10/2007 | Park et al. | | |
| 2008/0168267 A1* | 7/2008 | Bolen | ............... | H04M 1/72572 713/100 |
| 2008/0189793 A1 | 8/2008 | Kirkup et al. | | |
| 2009/0075592 A1* | 3/2009 | Nystrom | ............ | G06K 19/0719 455/41.1 |
| 2009/0112876 A1* | 4/2009 | Karul | ..................... | G06Q 30/02 709/204 |
| 2011/0107424 A1* | 5/2011 | Singh | ................ | G06F 17/30109 726/24 |
| 2012/0252403 A1* | 10/2012 | Becerra | .................. | G06Q 10/10 455/405 |
| 2013/0159467 A1* | 6/2013 | Lundholm | .............. | H04L 65/00 709/219 |

(Continued)

*Primary Examiner* — Haresh N Patel

(57) ABSTRACT

A user equipment includes a radio transceiver, a processor coupled to the processor, and a storage device containing executable instructions. When executed by the processor, the instructions cause the processor to examine files in the storage device for a signature indicative of a branding element and, upon detection of the signature in a file, perform a branding action on the file with the detected signature. The instructions also cause the processor to determine whether an application loaded on the storage device is operating consistent with permissions set for the application and with a usage profile for the application and to generate an alert when the operation of the application is inconsistent with the usage profile despite being consistent with the permissions.

15 Claims, 14 Drawing Sheets

(56) References Cited

U.S. PATENT DOCUMENTS

| | | | | |
|---|---|---|---|---|
| 2013/0196615 A1* | 8/2013 | Zalmanovitch | | H04W 24/02 455/405 |
| 2014/0108469 A1* | 4/2014 | Majka | | G06F 17/3007 707/821 |
| 2014/0108793 A1* | 4/2014 | Barton | | G06F 21/6218 713/165 |
| 2014/0267598 A1* | 9/2014 | Drouin | | G03H 1/0005 348/40 |
| 2015/0339361 A1* | 11/2015 | Prasanna Kumar | | G06F 17/30566 707/769 |
| 2016/0098334 A1* | 4/2016 | Hariharakrishnan | | G06F 11/3013 702/186 |
| 2016/0173402 A1* | 6/2016 | Broussard | | H04L 43/0876 709/224 |
| 2016/0191356 A1* | 6/2016 | Sundaresan | | H04L 67/42 709/224 |
| 2016/0191534 A1* | 6/2016 | Mallozzi | | G06F 21/6218 726/4 |
| 2016/0255616 A1* | 9/2016 | Martin | | H04W 72/048 709/217 |
| 2017/0013630 A1* | 1/2017 | Franz | | H04L 5/00 709/201 |

\* cited by examiner

| Resource | Usage |
|---|---|
| Camera | Used with microphone, only user-authorized |
| Microphone | Used with camera, only user-authorized |
| WiFi | Less than 10 MB/s |
| Bluetooth | Not used |
| Cellular | Less than 1 GB in a 20 day period |
| GPS | Less than 10 times per day |
| Email | Not used |
| Text | Not used |

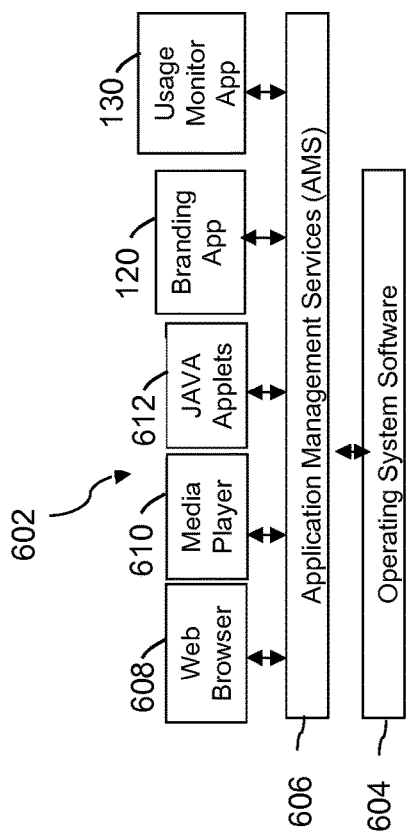
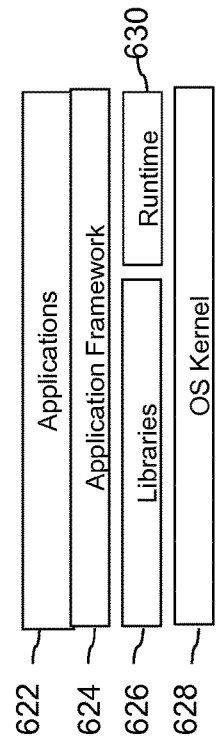
FIG. 13A
FIG. 13B

BRANDING AND IMPROPER OPERATION DETECTION ON A USER EQUIPMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile phones are electronic devices used for mobile voice and data communications. A given mobile phone may have various branding elements to identify the source of the phone, the source of services provided on the phone, etc. For example, a particular service provider to which a user of a mobile phone subscribes may cause the phone to generate a distinct audible tone unique to that service provider upon the phone sending an email or text message. In another example of a branding element, a logo unique to the service provider may be displayed on the phone's screen during the power-on process for the phone or at other times. Further, users may download applications (sometimes referred to as "apps") onto their phones. Some applications may access various resources on the phone such as the camera, cellular service, the Global Positioning System (GPS) location service, etc. Users of some phones can specify which resources each application can and cannot access.

SUMMARY

In an embodiment, a user equipment (UE) includes a radio transceiver, a processor coupled to the processor, and a storage device containing executable instructions. When executed by the processor, the instructions cause the processor to examine files in the storage device for a signature indicative of a branding element. The branding element identifies a source of the UE or service provider of a wireless service implemented on the UE. The branding element comprises at least one of: a logo, a text field, a customer care short code or phone number, a voice mail phone number or short code, a widget, an audible tone, an application, a power-on video animation, a power-off video animation, and a link to an application store. Upon detection of the signature in a file, the instructions cause the processor to remove the file with the detected signature.

In another embodiment, a user equipment (UE) includes a radio transceiver, a processor coupled to the processor, and a storage device containing executable instructions. When executed by the processor, the instructions cause the processor to load an application and receive permissions for the application. The permissions specify UE resources that the application is permitted to access. The instructions further cause the processor to receive a usage profile for the application, wherein the usage profile specifies how the application is to use the UE resources permitted by the permissions. During execution of the application, the instructions also cause the processor to compare operation of the application to the usage profile and generate an alert when the operation of the application is inconsistent with the usage profile.

In yet another embodiment, a user equipment (UE) includes a radio transceiver, a processor coupled to the processor, and a storage device containing executable instructions. When executed by the processor, the instructions cause the processor to examine files in the storage device for a signature indicative of a branding element and, upon detection of the signature in a file, perform a branding action on the file with the detected signature. The instructions also cause the processor to determine whether an application loaded on the storage device is operating consistent with permissions set for the application and with a usage profile for the application and to generate an alert when the operation of the application is inconsistent with the usage profile despite being consistent with the permissions.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 5 shows an example of a usage profile in accordance with various embodiments.

FIGS. 13A and 13B are block diagrams of a software architecture for a UE in accordance with various embodiments.

DETAILED DESCRIPTION

Figure 1:
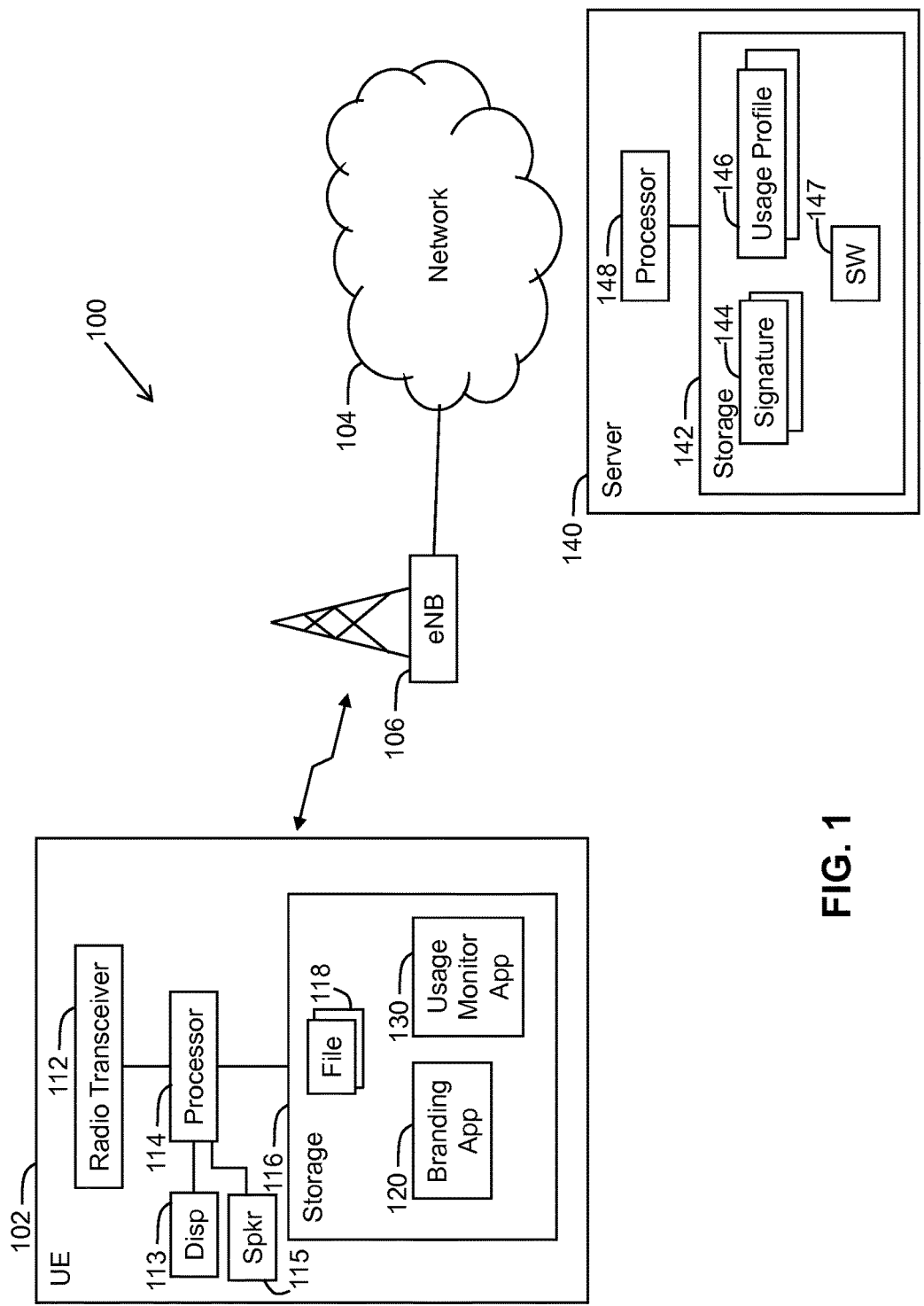
FIG. 1 is a block diagram of a system in accordance with various embodiments.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A user equipment (UE) or a mobile telecommunications device, such as a mobile phone, personal digital assistant, tablet device, etc., may have one or more branding elements configured on the UE. A branding element may be a source identifier. A branding element may include visual and/or audible identifiers of the service provider of the cellular service on the phone. A branding element also may be a particular application that runs on the UE and that is unique to the service provider. An example of such an application is a voice message app. On the other hand, a branding element may be any distinctive part of the user experience of the UE. For example, distinctive ring tones and display wallpaper may not identify a source (e.g., identify an original equipment manufacturer or identify a wireless communication service provider), particularly when a new model of a UE first hits the market and users have not come to associate the distinctive elements with the source.

The UE may be reconfigured from one type of service or service provider to another type of service or service provider. For example, a user may want to upgrade the service on the UE. The new service may be branded differently than the old service. That is, the branding elements of the old service may be removed or deactivated, or modified to the branding elements of the new service. However, some branding elements may remain despite the rebranding efforts. In some cases, for example, a third party application may have included a branding element that is not detected and eradicated during the rebranding process. The disclosed embodiments are directed to a UE that includes a branding application that searches the files on the UE for predetermined signatures indicative of the old branding elements. The signatures to be searched may be transmitted to the UE from a centralized service that stores and keeps track of such signatures. Upon encountering a file containing an outdated branding element, the UE performs a branding action such as removing the file containing the branding element. Other branding actions are possible as well and are described below.

The UE also may include a usage monitor application that monitors the operation of the apps on the UE. The user may have authorized each particular application to have access to certain resources on the UE, but the applications may use the permitted resources more than is reasonable for the proper operation of the app. In some embodiments, a usage profile is provided to the UE that is unique to each app. The usage profile for a given application specifies how that application is to use the various resources on the UE. For example, a user-granted permission may specify that the application can use the UE's cellular transceiver to send and receive data through the cellular network. However, the usage profile may provide a usage profile of 1 gigabyte for a 7 day period time meaning that the application should not send or receive more than 1 gigabyte over any 7 day period of time.

In another example, a usage profile may specify at least one of: a data transmission rate through the radio transceiver (which may be for any or all of Wi-Fi, Bluetooth®, and cellular), a total amount of data to be transmitted through the radio transceiver, and frequency of use of a hardware resource of the UE. In yet another example, access to certain actions or components may be restricted when an application requesting such access is not actively being used by a user of the UE. For example, an application that is permitted to use the UE's camera may be denied use of the camera if the user is currently using a different application and/or not using the application permitted to otherwise use the camera. Applications that are generally permitted to use the UE's location service (e.g., GPS) also may be denied use of the location service when the UE's user is not actively using such an application.

In another example, an application may be permitted use of a component or service, but the usage profile will only permit partial access to the component/service. For example, an application may be granted access to the UE's contact list, but the usage profile may provide access to only a subset of the contacts (e.g., only business contacts, or contact not tagged as "private," etc.). The user-specified permission does not provide a usage limit on the application's access to that particular resource, but the usage profile provides operational thresholds that, if exceeded, cause the usage monitor application to take corrective action such as generating an alert, suspending execution of the application pending authorization by the user, etc. In some embodiments, a secure container in which each application (e.g., user downloaded application, user application, or third party application) executes may implement the functionality of monitoring an app's behavior relative to its usage profile. Thus the secure container, usage monitor application, and/or usage profile may provide a finer grained, more nuanced access permission than traditional permissions.

The branding and usage monitor applications (which may be integrated together in one application or may be separate applications) function to ensure branding consistent with the service provided on the UE and that all applications operate within reasonable limits. Detection of improper branding elements and/or improper application behavior causes the UE to respond in an appropriate manner such as by removing improper branding elements and/or suspending execution of an application that is operating inconsistently with its usage profile despite actually being consistent with its user-specified permissions.

FIG. 1 shows an example of a communication system 100 in accordance with various embodiments. The example of the system 100 shown includes a UE 102, an enhanced Node B (eNB) 106, a network 104, and a server 140. Any number of UEs 102 can be in wireless communication with any number of eNBs 106, and through their respective eNB to server 140. In the example of FIG. 1, the UE 102 includes a radio transceiver 112, a processor 114, a display 113, a speaker 115, and a storage device 116. The UE 102 may be a mobile telecommunications device, such as a mobile phone, a smart phone, a media player, a personal digital assistant (PDA), or a wireless enabled laptop, notebook, or tablet computer. The processor 114 couples to the radio transceiver 112, storage device 116, display 113, and the speaker 115. The radio transceiver 112 provides a wireless communication link to the UE 102 and couples the UE through the eNB 106 to network 104. A cellular service provider may provide and operate the service provider network 104 to which the various eNBs 106 communicate to server 140 and to each other. The storage device 116 may be separate from the processor 114 as shown, or may be integrated into the processor 114. The storage device 116 may include volatile storage (e.g., random access memory), non-volatile storage (e.g., solid state storage), or a combination of both volatile and non-volatile storage devices. The storage device may be a single storage device or multiple storage devices.

The eNB 106 provides a wireless communication link to the UE 102 in accordance with a variety of wireless protocols. Examples of such wireless protocols include the code division multiple access (CDMA) wireless communication protocol, he global system for mobile communication (GSM) wireless communication protocol, the long-term evolution (LTE) wireless communication protocol, the world-wide interoperability for microwave access (Wi-MAX) wireless communication protocol, or any other suitable wireless communication protocol.

The service provider network 104 may include a plurality of switches, routers, software, and other elements to provide connectivity for the UEs 102 to the service provider's servers (e.g., server 140), storage, and various services offered by the service provider.

Referring still to FIG. 1, the storage device 116 of UE 102 includes one or more files 118, a branding application 120, and a usage monitor application 130. The files 118 may be applications themselves, data files, configuration files, etc. The branding application 120 is executable by the processor 114 and performs the functionality described herein attributed to it. All functionality attributed to the branding application 120 is implemented by the processor 114 upon execution of the branding application 120. Similarly, the usage monitor application 130 is executable by the processor 114 and performs the functionality described herein attributed to it. All functionality attributed to the usage monitor application 130 is implemented by the processor 114 upon execution of the usage monitor application 130. The applications 120, 130 may be executed as background processes without being invoked by a user of the UE 102 (e.g., triggered by a power-on reset event), or a user may manually cause either or both applications 120, 130 to execute.

The Branding Application 120

A given UE 102 may be reconfigured from one brand to another. For example, the service provider's service on a UE 102 may be changed to a different service of the same service provider, or to a different service provider altogether. Such a change-over may include removing brand-specific elements from the UE 102 and installing new brand specific elements. Unfortunately, not all legacy branding elements may be successfully removed and replaced during the rebranding process. As noted above, for example, a user may have downloaded a third party application that includes a branding element. The rebranding process may not be able to detect and remove all branding elements in third party applications. The branding application 120 executes, for example, upon completion of the rebranding process or at other times to identify any remaining, legacy branding elements (i.e., branding elements corresponding to the old service) and performs a branding action upon detection of a legacy branding element (e.g., removing a file determined to contain a legacy branding element).

Referring still to FIG. 1, server 140 includes a processor 148 coupled to storage 142. Storage 142 may include volatile storage (e.g., random access memory), non-volatile storage (e.g., hard disk drive), or combinations of both. The storage 142 includes one or more signatures 144, usage profiles 146, and software 147 executable by processor 148. The signatures 144 are provided to and used by the branding applications 120 on the UEs 102, and the usage profiles 146 also are provided to and used by the usage monitor applications 130. The server 140 performs the functionality described herein as attributed to the server 140 upon its processor 148 executing software 147.

The signatures 144 uniquely identify branding elements. A branding element identifies the source of the phone, the source of services provided on the phone, etc. For example, a particular service provider to which a user of a UE subscribes may cause the phone to generate a distinct audible tone unique to that service provider or manufacturer of the phone upon the phone sending an email or text message. The distinct audible tone is an example of a branding element. A ring tone that is unique to the service provider or manufacturer of the phone also is an example of a branding element. In another example, a logo unique to the service provider may be displayed on the phone's screen during the power-on process for the phone or at other times. The logo is a visual type of branding element. In general, branding elements can include a logo, a text field, a customer care short code or phone number, an audible tone, a voice mail short code or phone number, a widget, an app, a power-on video animation, a power-off video animation, and a link to an application store. The branding elements may be stored in one or more of the files 118.

In some embodiments, a file 118 may be an application that causes, among other things, a logo to be displayed on the UE's display 113. The particular bits that represent the logo may be encoded into the application itself or may be stored in a separate file that is accessed by the application when it is time to display the logo. In another example, a file 118 may be an application that causes a brand specific audible tone to be generated by the UE's speaker 115. The tone may be a brand specific ring tone generated by receipt of an incoming phone call, a tone generated by the outgoing transmission of an email or text message, etc. The audible tone may be encoded in the application that causes the tone to be generated, or the audible tone may be stored in a separate file and accessed by the app.

Each signature 144 uniquely identifies a particular branding element. The signature may be the particular set of bits that represent the branding element. In other embodiments, a signature may be a hash or other type of value computed based on the bits representing the branding element. Commensurate with the description above of branding elements, each signature is indicative of a least one of: a logo, a text field, a customer care short code or phone number, an audible tone, a voice mail short code or phone number, a widget, an app, a power-on video animation, a power-off video animation, and a link to an application store. In some embodiments, each signature 144 comprises a predetermined sequence of bits.

The signatures 144 are unique to each branding element and may be unique to particular models of UEs 102. For example, a particular logo may be stored in, and displayed on, different models of UEs 102. The specific bit representation of the logo may vary from model to model of a UE, and thus the signatures for the logo will vary as well. To the extent a particular signature 144 is different across different models of a UE, a UE model identifier may be stored with each such signature 144. The signatures that are potentially relevant to a given model of UE 102 may be provided by the server 140 to the UE. The branding application 120 on the UE 102 may initiate the request to receive signatures 144 from the server that correspond to that particular UE. The branding application 120 examines its files 118 for the presence of each signature. Upon encountering a signature 144, the branding application 120 performs a branding action. The branding action may be to remove or suspend use of the file 118 determined to contain a signature indicative of a legacy branding element. Another branding action may include replacing the identified file 118 with a similarly functioning file that has the new branding element.

Figure 2:
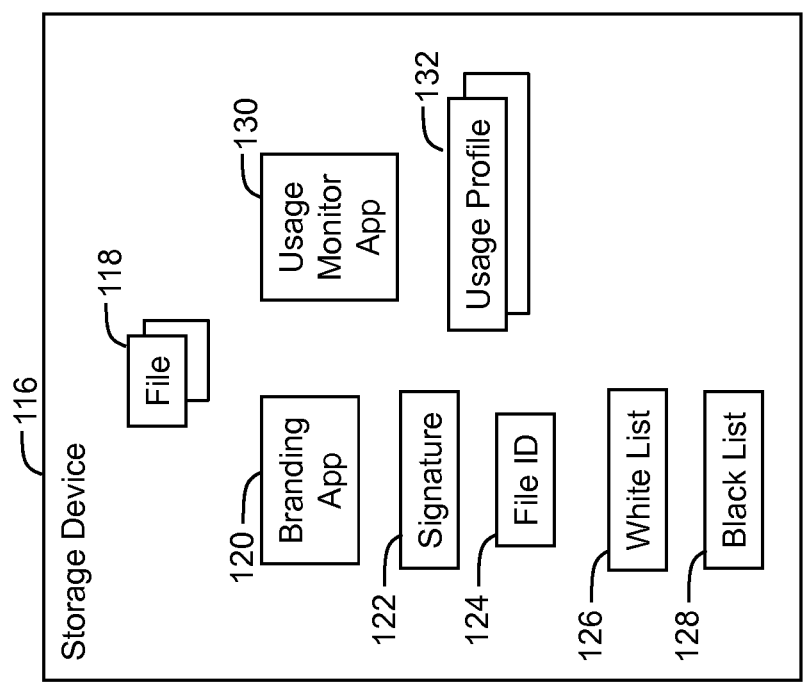
FIG. 2 shows an example of a storage device of a user equipment (UE) which includes a branding application and a usage monitor application in accordance with various embodiments.

FIG. 2 shows an additional example of the contents of the UE's storage device 116. As explained above, the UE's storage device 116 includes files 118, the branding application 120, signature storage 122, file identifiers (IDs) 124, a white list 126, a black list 128, the usage monitor application 130 (discussed below), and usage profiles 132 (also discussed below). The signatures 122 include one or more of the signatures 144 from the server 140 or other centralized service that are received by the UE 102 via radio transceiver 112. The UE 102 (e.g., via the radio transceiver 112) may receive multiple signatures 144 from the server 140, and the branding application 120 examines the files 118 for each such signature. The received signatures 144 are stored in signature storage 122 and may be accessed one at a time by the branding application 120 to identify files 118 containing such signatures. That is, the branding application examines files 118 for a given signature from signature storage 122, performs the branding action if a signature is found in a file 118, obtains another signature from signature storage 122 and repeats the process. In an alternative embodiment, the branding application 120 may access all of the signatures from signature storage 122 at one time and may examine all files 118 for the presence of any of the signatures.

File ID storage 124 includes identifiers of those files 118 that are known to contain or possibly contain branding elements. Not all files 118 on the UE 102 necessarily contain a branding element, and thus, while such files could be examined for signatures if desired, such files need not be examined for signatures. In some embodiments, each file 118 is examined for signatures indicative of branding elements without regard to whether such file conceivably could even contain a signature. In other embodiments, however, the branding application 120 accesses file ID storage 124 and only examines those files 118 for signatures whose IDs are contained in ID storage 124. By avoiding examining only those files that are known apriori not to contain branding elements, the examination of such files on the UE 102 for legacy branding elements is more efficient and thus faster than if all files 118 are examined. A file ID for a given file 118 may be an alphanumeric designation, a binary designation, etc. of the corresponding file 118.

In other embodiments, file ID storage 124 includes identifiers of those files 118 that are known apriori not to contain branding elements. In this embodiment, the branding application 120 only examines those files 118 whose IDs are not contained in the file ID storage 124.

Upon examining a file 118 and determining such file not to contain a signature indicative of a legacy branding element, the ID for that file may be stored by the branding application 120 in the white list 126. The branding application 120 stores IDs of those files 118 determined to contain one of the signatures in the black list 128. Thus, the black list 128 contains identifiers of those files that are determined to contain legacy branding element. Both the white and black lists 126, 128 can be provided if desired, but need not be. In some embodiments, only the white list 126 is provided and only those files 118 included on the white list 126 are permitted to be executed or otherwise used on the UE 102. In other embodiments, only the black list 128 is provided and only those files 118 that are not included on the black list 128 are permitted to be executed or otherwise used on the UE 102. In some embodiments, the identifiers in the white list 126 and/or black lists 128 may be transmitted back to the server 140 to be stored in storage 142. This may provide a kind of crowd-sourced, information sharing that the service provider can leverage across the whole fleet of deployed UEs. Stated in other words, sharing back the information may provide a kind of automated learning.

Figure 3:
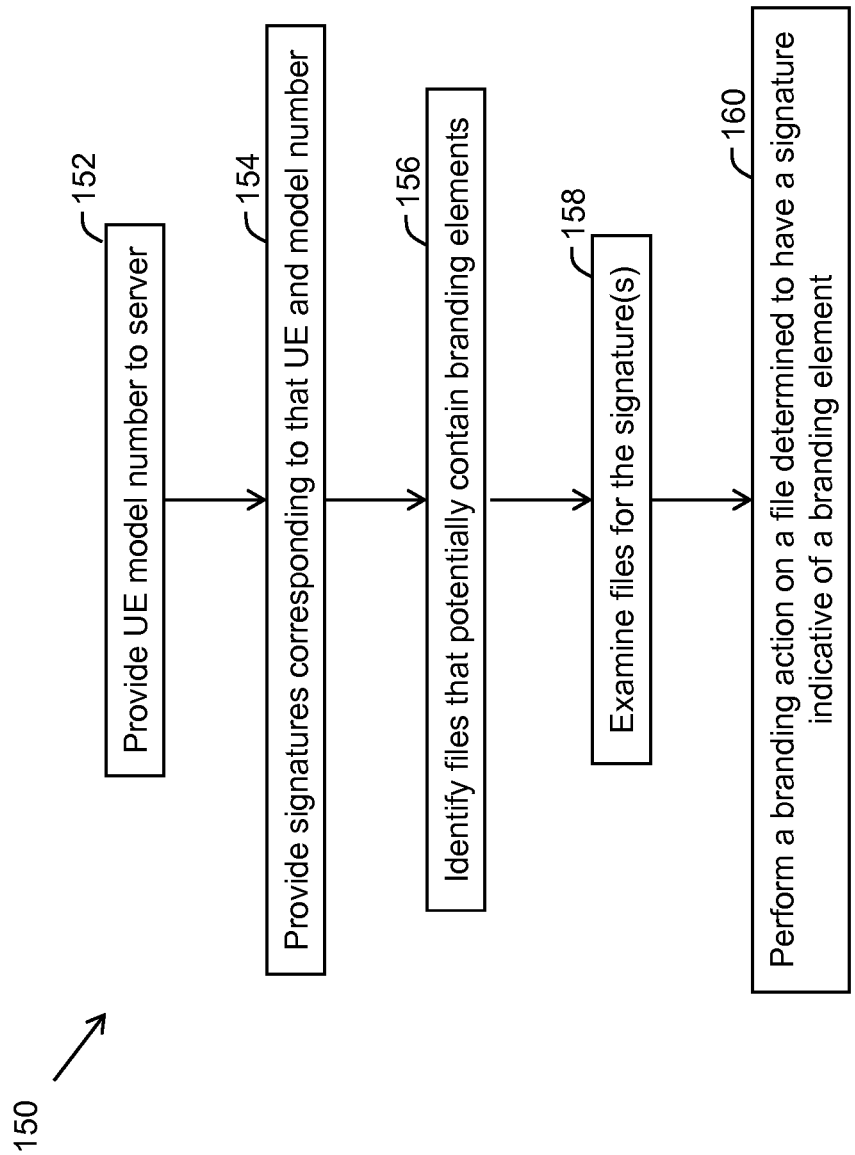
FIG. 3 shows a method of performing a branding event upon encountering a file having a signature in accordance with various embodiments.

FIG. 3 provides an example of a method 150 performed in accordance with various embodiments. The operations can be provided in the order shown, or in a different order. Further, two or more of the operations may be performed concurrently instead of sequentially. Method 150 in general, may be initiated by the branding application 120. In one implementation, the branding application 120 automatically runs the first time the UE 102 is turned on following a rebranding event, or the branding application 120 may execute each time the UE 102 is reset or power cycled. In other embodiments, the server 140 may initiate operation 152.

At 152, the model designation of the UE 102 is provided by the UE to the server 140. The model designation may be pushed by the UE 102 to the server in some embodiments. In other embodiments, the model designation may be provided to the server 140 in response to a request for such information.

At 154, the method includes the server 140 retrieving those signatures 144 from its storage device 142 that correspond to that particular UE. The server 140 transmits any and all signatures corresponding to the UE's model designation to the UE 102 via a wireless interface. The server is informed as to what the current branding is for the UE— either because the server is operated by the service provider and the service provider knows the branding for each of its customers' UEs or because the UE provides information to the server to indicate its current branding. The server provides the signatures to the UE that correspond to any and all branding elements other than those branding elements that are legitimately part of the current branding for the UE.

At 156, the method includes identifying files 118 on the UE's storage device 116 that contain branding elements. In the implementation in which file ID storage 124 contains IDs of files that conceivably contain branding elements, operation 156 may be performed by the branding application 120 accessing the file ID storage 124 and only examining those files 118 that are identified in file ID storage 124. In the implementation in which file ID storage 124 contains IDs of files that are known apriori not to contain branding elements, operation 156 may be performed by the branding application 120 accessing the file ID storage 124 and only examining those files 118 that are not identified in file ID storage 124.

At 158, the branding application 120 examines all of the files 118, or the subset of files 118 based on the IDs in file ID storage 124, for the signatures received from the server 140. At 160, the branding application performs a branding action on each file determined to have a signature indicative of a branding element. As explained above, the branding action may be to remove the file 118 containing the signature. In other embodiments, the branding action may be to replace the file 118 with a file containing a new branding element. In yet another embodiment, a branding action may be to notify the user of the UE that a legacy branding element has been found on his or her UE. Further, the branding action may prompt the user of the UE for authorization as to whether to use the file containing the legacy branding element, or not use the file. That is, the user can have control over whether a legacy branding element can be used on the UE.

The Usage Monitor Application 130

Figure 4:
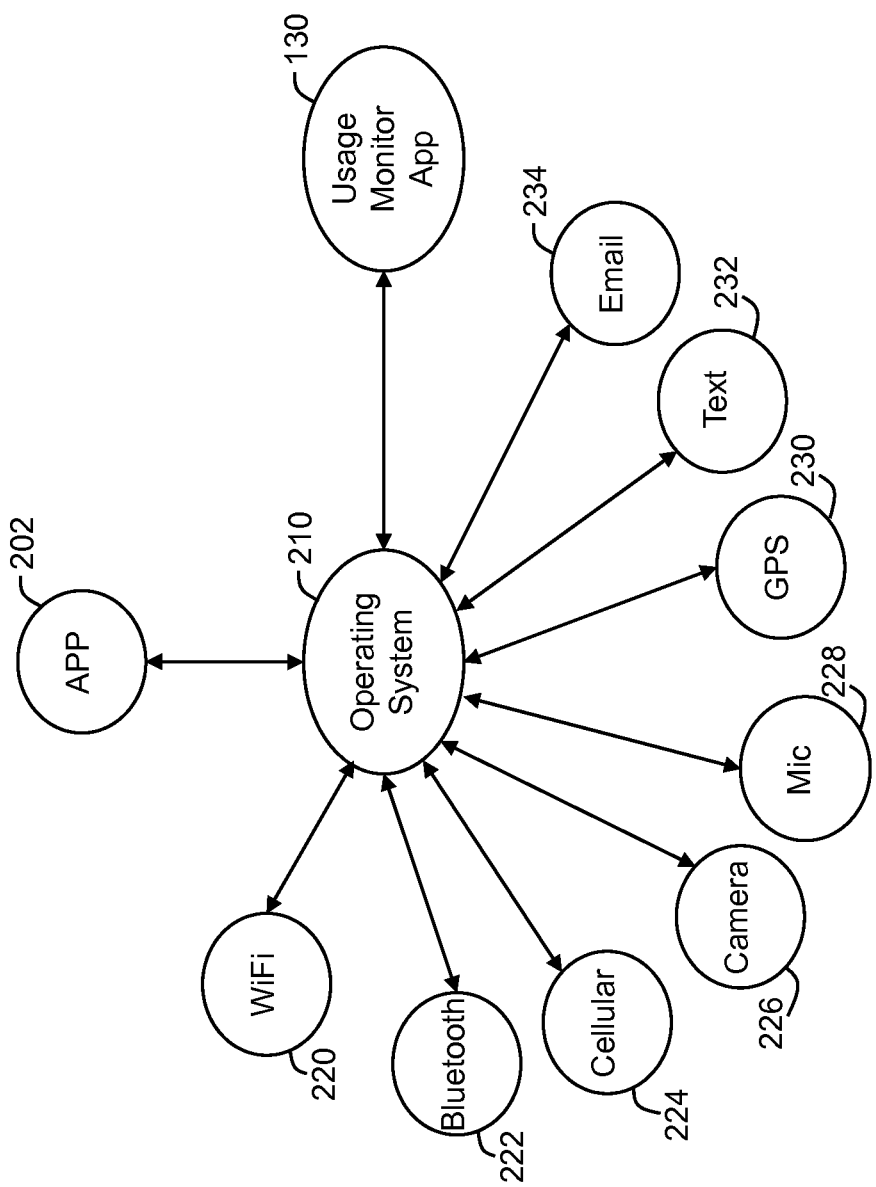
FIG. 4 depicts the interaction between an app, the operating system, various resources, and the usage monitor application in accordance with various embodiments.

Referring again to FIG. 1, the usage monitor app 130 determines whether the operation of a given app comports with the usage expected for that app. During or after the process of loading an app on the UE 102, a user of the UE may specify one or more permissions for the app's subsequent execution. Some applications may not prompt the user for any permissions. For applications that do require the user to grant permissions, such permissions may include, for example, to which hardware and/or software resources the application can have access. Turning to the example of FIG. 4, an application 202 can access various UE resources 220-234 through an operating system 210. Such resources can include those illustrated in FIG. 4, additional resources, or a different set of resources. The resources illustrated in FIG. 4 include a wireless Wi-Fi interface 220, a wireless Bluetooth® interface 222, a wireless cellular interface 224, a camera 226, a microphone 228, a GPS receiver 230 (or other type of location service), a text messaging service 232, and an email service 234. The application 202 may be granted permission by a user of the UE 102 to use any or all of the resources 220-234. Of course, depending on the functionality of certain applications, it may not make sense for some of the UE's resources to be used by a given application 202, but for those resources that conceivably could be usable by the application 202, the user can individually enable and disable access and use of each such resource by the app.

The user-specified permissions specify whether or not the application 202 can access each of the various resources 202-234, but not operationally how the application 202 is to use each resource. For example, a permission for application 202 may be that the application can use the wireless cellular interface 224, but the permission may not specify the data rate and aggregate amount of data transmitted by the application 202 through the cellular interface 224. By way of an additional example, a permission may be specify that the application 202 can access the camera 226 and microphone 228, but not specify how often the application 202 can use those particular resources or whether the camera and microphone can be used without user consent during run-time of the app.

FIG. 1 illustrates that the server's storage device 142 includes multiple usage profiles 146. In some embodiments, each usage profile 146 corresponds to a particular app. In other embodiments, a given usage profile 146 may correspond to more than one app. That is, two or more applications may have similar intended behaviors in terms of the use of the UE's underlying resources and thus may share a common usage profile 146. Each usage profile 146 specifies how one or more underlying resources are to be used. The usage profiles may be predetermined by the creators of the corresponding applications, the service provider, etc. and may be determined based on historical usage of the resources by the applications. In some embodiments, the usage profile specifies upper limits on acceptable operational behavior of the app. For example, the application can access any of the UE's resources and use them however the application decides as long as the usage does not exceed the limits specified in the usage profile for that app. Each usage profile may specify at least one of: a data transmission rate through the radio transceiver (which may be for any or all of Wi-Fi, Bluetooth®, and cellular), a total amount of data to be transmitted through the radio transceiver, and frequency of use of a hardware resource of the UE. In one example, the usage profile may specify a cellular data transmission threshold of 150 megabytes in a 7 day period of time. This means that, when in use, the application should not attempt to transmit more than 150 megabytes of data through the wireless cellular interface 224.

FIG. 5 provides an example of a usage profile 146 for a given app. The resources listed include the camera, microphone, Wi-Fi interface, Bluetooth® interface, cellular interface, GPS receiver, email service, and text message service. The usage profile 146 indicates that the application should not use the Bluetooth® interface, the email service, and the text message service. The camera can used, but is it to be used with the microphone and only when the user consents during operation of the app. Similarly, the microphone can used, but it is to be used with the camera and only when the user consents during operation of the app. The usage profile 146 specifies a data rate transmission threshold for the Wi-Fi interface of 10 megabytes per second. That is, if the Wi-Fi interface is used, the application should not transmit more than 10 megabytes per second of data through the Wi-Fi interface. Similarly, the usage profile 146 specifies a transmission threshold for the cellular interface of 1 gigabyte over any 20 day period of time. The data rate thresholds for the Wi-Fi and cellular interfaces may apply to outgoing transmissions from the UE, incoming received transmissions, outgoing and incoming transmissions separately, or all transmissions without regard to whether such transmissions are incoming or outgoing. Further, the GPS receiver should not be used more than 10 times per day.

In another example, a usage profile may specify at least one of: a data transmission rate through the radio transceiver (which may be for any or all of Wi-Fi, Bluetooth®, and cellular), a total amount of data to be transmitted through the radio transceiver, and frequency of use of a hardware resource of the UE 102. In yet another example, access to certain actions or components may be restricted when an application requesting such access is not actively being used by a user of the UE. For example, an application that is permitted to use the UE's camera may be denied use of the camera if the user is currently using a different application and/or not using the application permitted to otherwise use the camera. Applications that are generally permitted to use the UE's location service (e.g., GPS) also may be denied use of the location service when the UE's user is not actively using such an application. In another example, an application may be permitted use of a component or service, but the usage profile will only permit partial access to the component/service. For example, an application may be granted access to the UE's contact list, but the usage profile may provide access to only a subset of the contacts (e.g., only business contacts, or contact not tagged as "private," etc.).

In an embodiment, the usage profile 146 may not be represented in the form illustrated in FIG. 5. Said in other words, the representation of the usage profile 146 in FIG. 5 may be considered to be a logical view. In actuality, the usage profile 146 may represent resource to usage mapping with codes that are understandable to the usage monitor application 130. For example, "camera" may be represented by an integer '1,' "microphone" may be represented by an integer '2,' etc. Likewise, "not used" may be represented by an integer 1; "less than ten times/day" may be represented by an integer '25,' etc.

Figure 6:
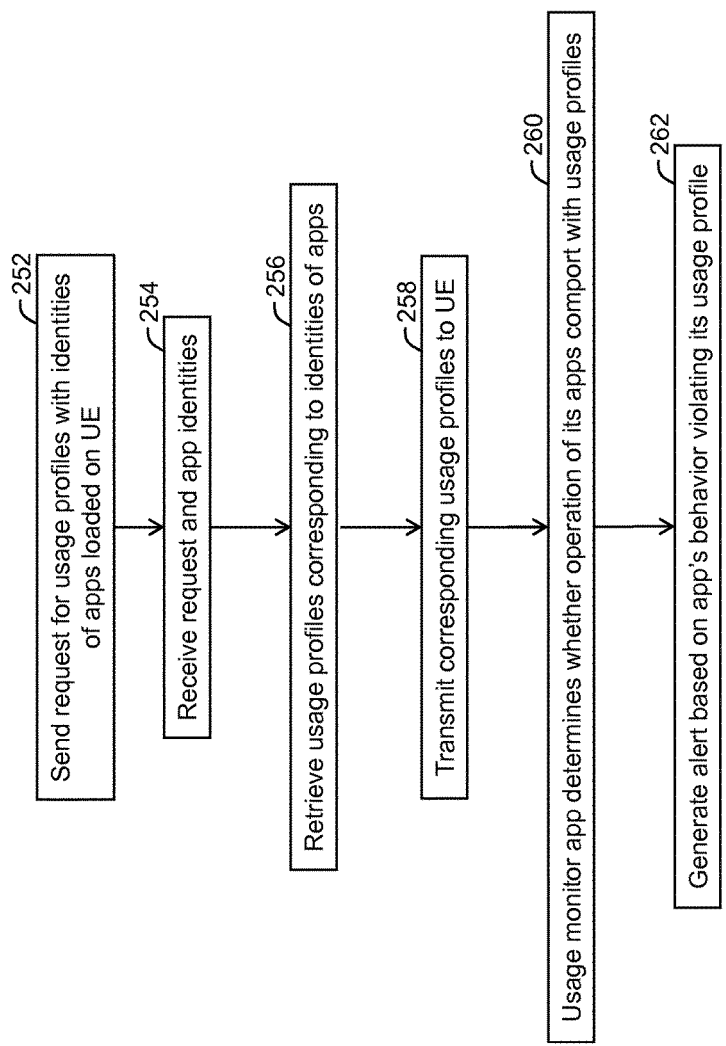
FIG. 6 shows a method of detecting improper application behavior on a UE in accordance with various embodiments.

FIG. 6 illustrates a method in accordance with various embodiments by which a UE obtains a usage profile from a service provider and generates alerts when an application on the UE violates an applicable usage profile. The operations can be provided in the order shown, or in a different order. Further, two or more of the operations may be performed concurrently instead of sequentially.

At 252, the method comprises the usage monitor application 130 sending a request to the service provider to send usage profiles 146 to the UE that corresponds to the applications loaded on the UE 102. This operation may be performed each time an application is installed on the UE 102, in which case the request may be a request for a usage profile of just the newly installed app. In other embodiments, periodically (e.g., once per day, per week, etc.) the usage monitor application 130 sends a request to the service provider to return all usage profiles applicable to all applications installed on the UE. The request includes identities of all applications installed on the UE.

At 254, the method includes the service provider's server 140 receiving the request. At 256, the server 140 retrieves the usage profiles 146 from its storage device 142 that correspond just to the application identities received from the UE (i.e., the applications installed on the UE). There may only be one usage profile for a given UE, or there may be multiple usage profiles. At 258, the usage profiles 146 are transmitted back to the UE 102 by the server 140.

The usage monitor application 130 stores the received usage profiles in its storage device 116 as usage profiles 132 (FIG. 2). At 260, the usage monitor application 130 determines whether the operation of the applications installed on the UE comport with the usage profiles 132 received from server 140. In some embodiments, the usage monitor application 130 may be integrated into the operating system 210 (FIG. 4) or may be a separate application that otherwise has access to the operating system 210. As a separate app, usage monitor application 130 may have privileged access to the operating system 210 by way of, for example, a cellular service provider having a digital certificate that enables such access. The applications that run on the UE access the UE's resources 220-234 (or whichever resources the applications are permitted to access based on the applications' functionality and user privileges) by way of the operating system 210. Through interaction with the operating system 210, the usage monitor application 130 is informed of all accesses to the UE's resources 220-234 and which applications request such resource usage.

Based on an operation of a given application (e.g., its usage of the UE's resources) being inconsistent with its corresponding usage profile (e.g., as determined by the usage monitor application 130), at 262 the usage monitor application generates an alert to the user. Such an alert may be generated despite the usage of the UE's resources being consistent with the permissions. That is, usage monitor application 130 may generate an alert when the operation of the application is inconsistent with the usage profile for the application despite the operation of the application being consistent with the app's user-specified permissions (if any). The alert may be visual and/or audible. Instead of, or in addition to, the alert, the usage monitor application 130 may suspend or terminate operation of the application whose operation is out of bounds with respect to its usage profile, or uninstall the application altogether. Further still, the usage monitor application 130 may prompt a user to authorize continued use of the application despite its usage being out of bounds with respect to the usage profile.

Figure 7:
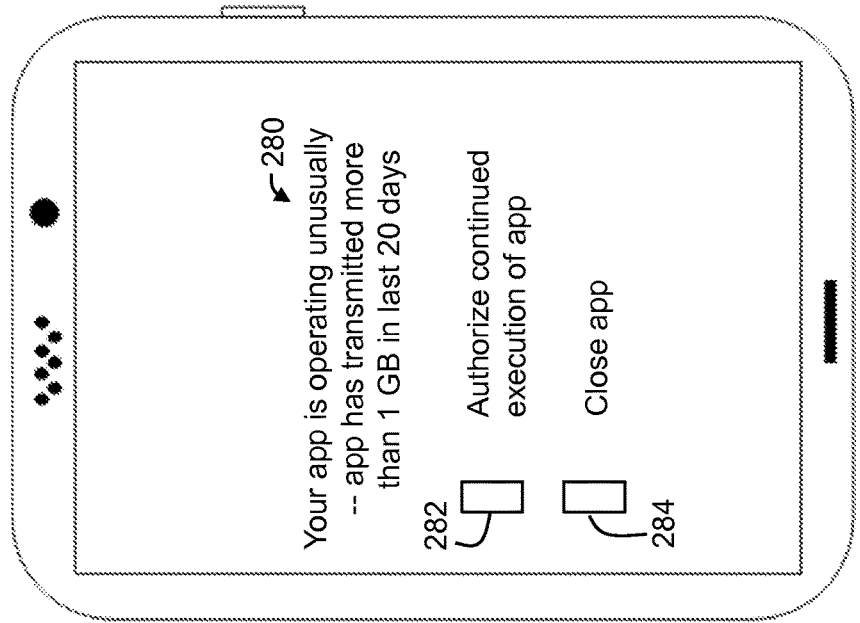
FIG. 7 shows an example of a message displayed on a UE upon an application exceeding an operational threshold in accordance with various embodiments.

FIG. 7 shows a display of the UE in which an alert 280 to the user is shown when operation of an application on the UE is inconsistent with its usage profile. In this example, the application has transmitted more than 1 GB of data over the UE's cellular interface over the last 20 day period of time. The alert provides multiple prompts 282 and 284 for selection by a user. Prompt 282 permits a user to authorize continued execution of the application despite its operation being inconsistent with its usage profile. Prompt 284 permits a user to have the application closed and its execution ceased.

Figure 8:
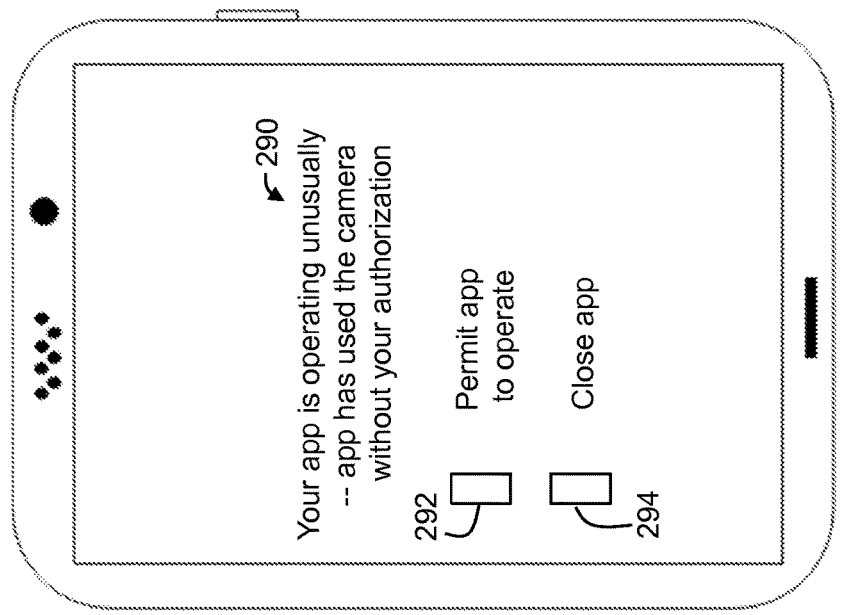
FIG. 8 shows another example of a message displayed on a UE upon an application exceeding an operational threshold in accordance with various embodiments.

FIG. 8 shows another example in which an alert 290 is generated to inform the user that an app's operational behavior is not proper (e.g., is inconsistent with its usage profile). In this example, an application has used the UE's camera 226 but without authorization from the user during runtime of the app. The alert further informs the user that execution of the application has been suspended. Multiple prompts 292 and 294 for selection by a user are provided. Prompt 292 permits a user to authorize continued execution of the application despite its operation being inconsistent with its usage profile. By selecting this prompt, the suspended operation of the application will be discontinued and the application will be permitted to continue its operation. Prompt 294 permits a user to have the application closed.

Figure 9:
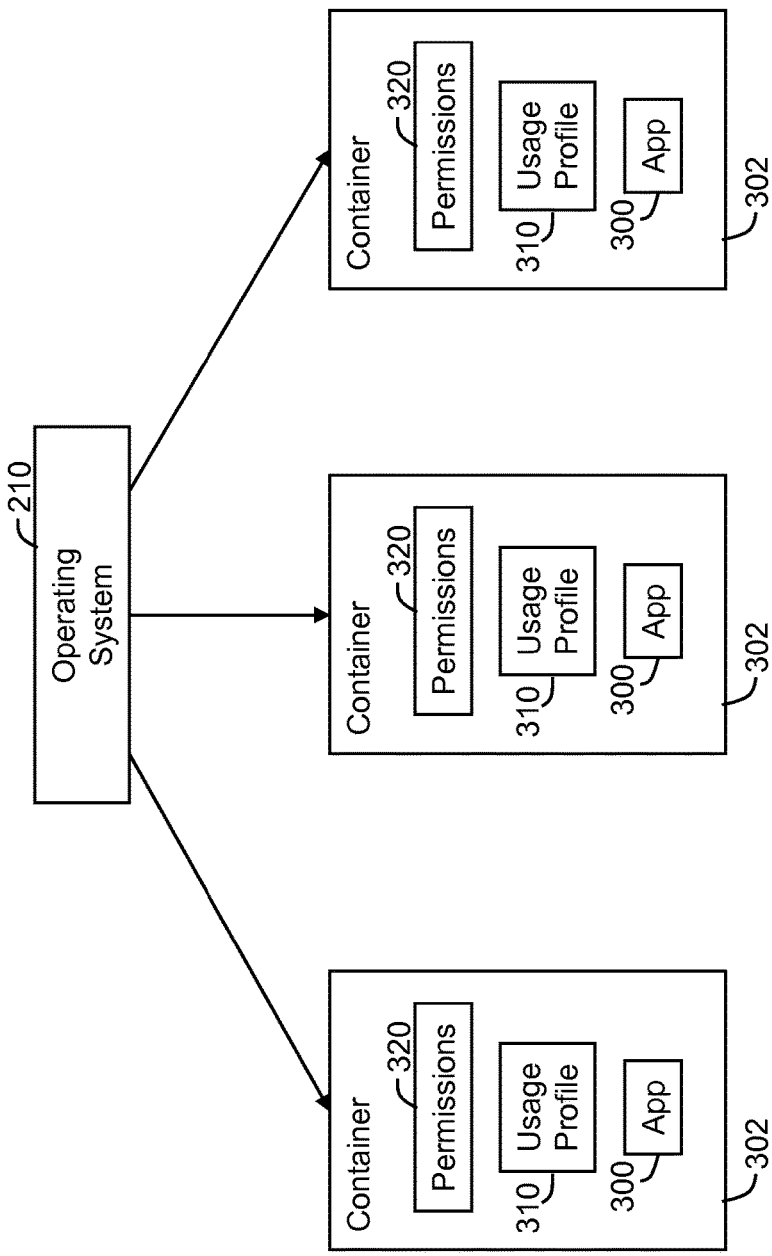
FIG. 9 illustrates the use of containers to implement the usage profiles example of a message that can be displayed on a UE upon an application exceeding an operational threshold in accordance with various embodiments.

FIG. 9 shows a block diagram in which one or more of the applications 300 on the UE execute within security containers 302. For example, an application that is not prescreened and certified by the service provider may be downloaded onto the UE but run within a security container 302. Each security container 302 is an application execution environment that restricts access by the application running therein to various resources and data on the UE. The security container 302 may provide a software interface between the underlying application 300 and the UE's operating system 210. The security container 302 may preclude the application 300, for example, from accessing certain areas of memory in which the operating system runs and from accessing the UE's contacts if not needed for the proper functioning of the app, etc. The security container 302 may log or collect counts of instances of the application 300 attempting actions that the security container 302 blocks and may provide a report to the operating system for use in evaluating the trustworthiness or security of the application 300. Permissions 320 are authorized for each application 300 which provide those resources, memory locations, etc. which the application is permitted to use (or not to use).

Execution of an application 300 in a security container 302 may be temporary until the operating system 210 or security container 302 determines that the application 300 is safe (e.g., based on the report of blocked actions) and reliable to use on the UE without the protection provided by the security container. The duration of time in which the application 300 runs within the security container 302 may be for a fixed period of time (e.g., seven days), for a fixed number of user interactions with the application 300, or a combination of time and number of user interactions.

The usage profile 310 provides operational thresholds for the app's usage of various resources, also as explained above. Each container 302 monitors the operational behavior of its application 300 and determines whether the app's operation is consistent or inconsistent with the applicable usage profile 310.

Combination of Branding Element Detection and Inconsistent Application Behavior

Figure 10:
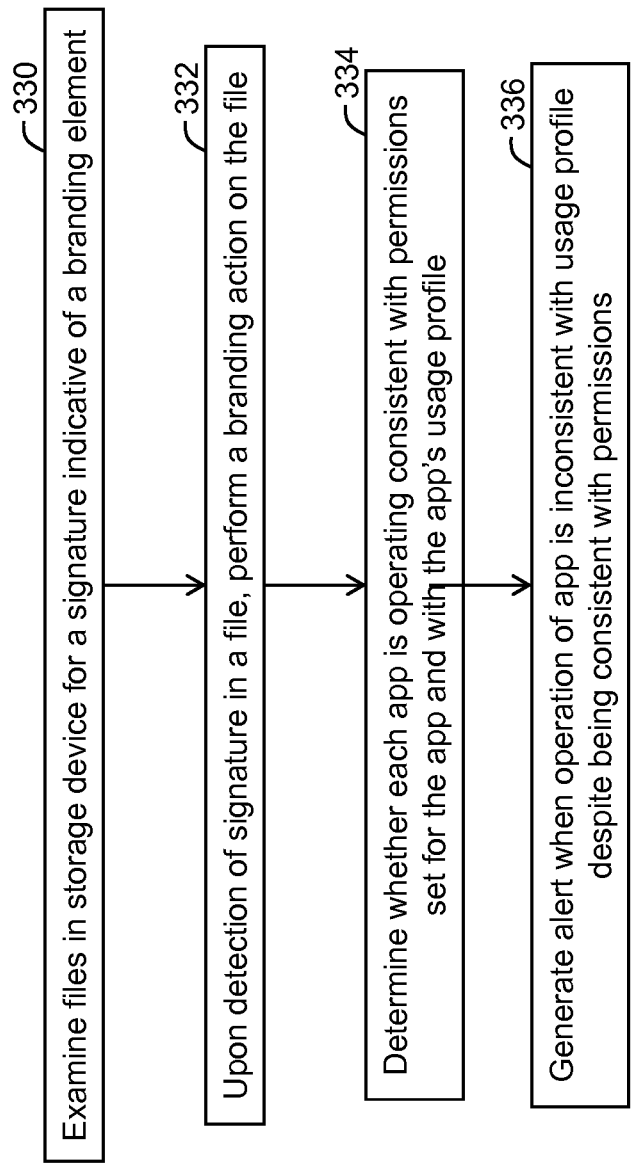
FIG. 10 shows a method in which outdated branding elements are detected and alerts are generated for applications that exceed an operational threshold in accordance with various embodiments.

FIG. 10 shows a method in which the UE both detects legacy branding elements and generates an alert when an app's operational behavior is inconsistent with its usage profile. The operations can be provided in the order shown, or in a different order. Further, two or more of the operations may be performed concurrently instead of sequentially.

At 330, the method includes examining files (e.g., files 118) on the UE's storage device 116 for a signature indicative of a branding element. Multiple files 118 may be examined for one signature indicative of a particular branding element or multiple signatures indicative of multiple such branding elements. The files examined may include all files on the UE or just those files known to potentially have branding elements (e.g., by way of file IDs stored in ID storage 124).

Upon detection of a signature in a particular file, the branding application 120 performs a branding action (332). The branding action may include deleting a file containing a signature (i.e., a file containing a legacy branding element), removal of the detected signature in the file, replacement of the branding element corresponding to the detected signature with a different branding element, or quarantining the file in which the signature is detected (e.g., changing a use status of the file to a status in which the file cannot be used).

At 334, the method further determining whether each application that is actively running on the UE is operating consistently both with permissions set for the application and with the app's usage profile. This operation may be performed by the usage monitor application 130 as explained above.

At 336, the usage monitor application 130 generates an alert for an application when operation of the application is inconsistent with the app's usage profile despite use of the underlying resources of the UE being consistent with the permissions granted by the user for the app. The alert may specify which application is operating improperly as well as the activity by the application that is deemed to be improper. User prompts may be provided to permit a user to suspend operation of the app, close the app, permit the application to continue executing anyway, etc.

Hardware

Figure 11:
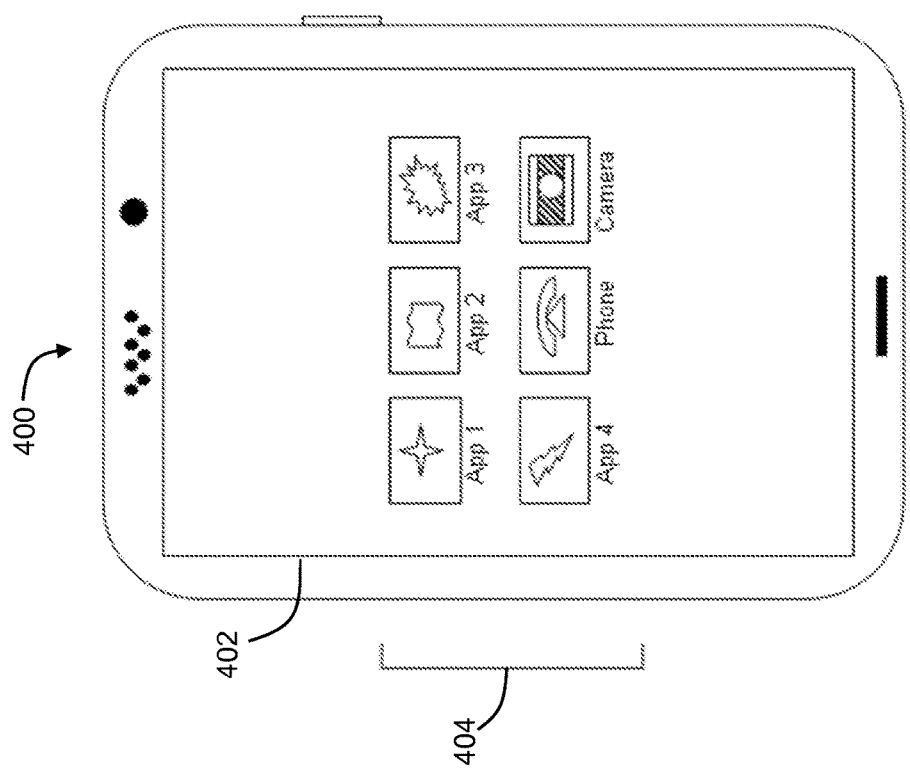
FIG. 11 is an illustration of a smart phone according to an embodiment of the disclosure.

FIG. 11 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 12:
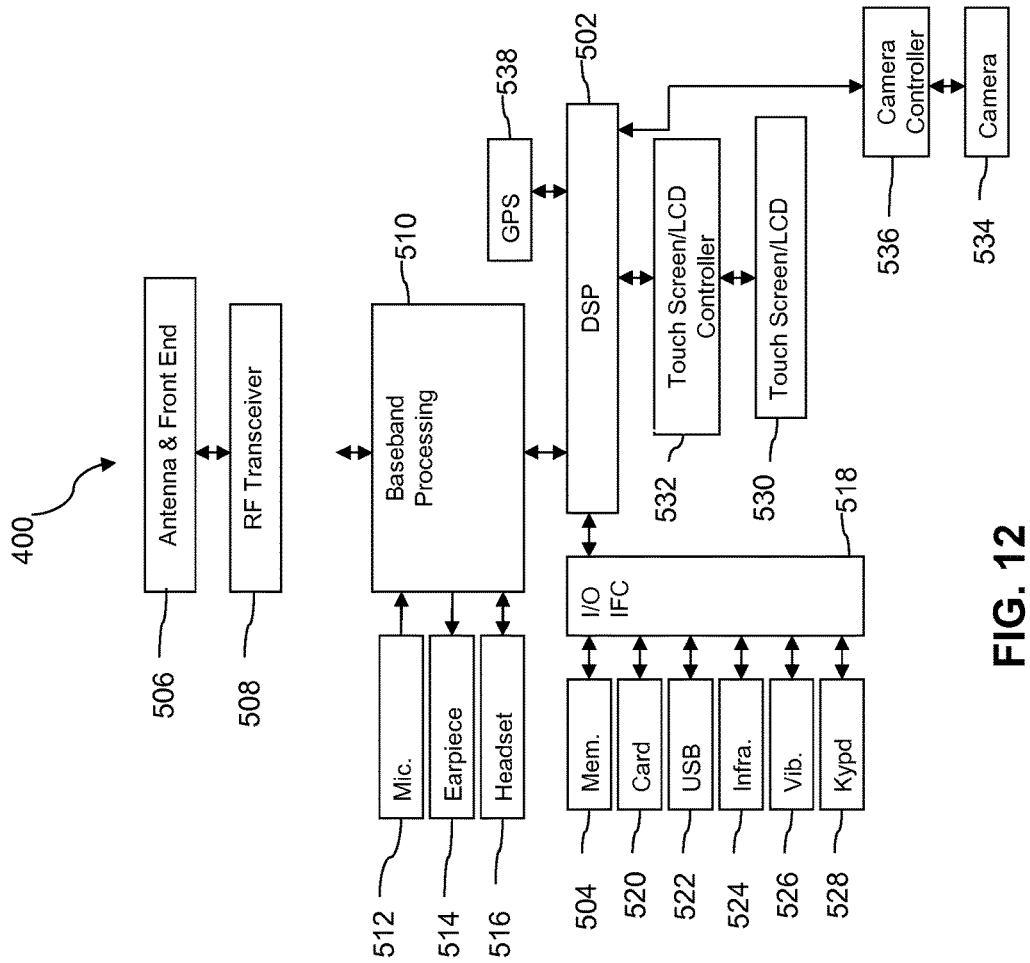
FIG. 12 is a block diagram of a UE in accordance with various embodiments.

FIG. 12 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

FIG. 13A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 13A are a web browser application 608, a media player application 610, JAVA applets 612, the branding application 120, and the usage monitor application 130. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

FIG. 13B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 14:
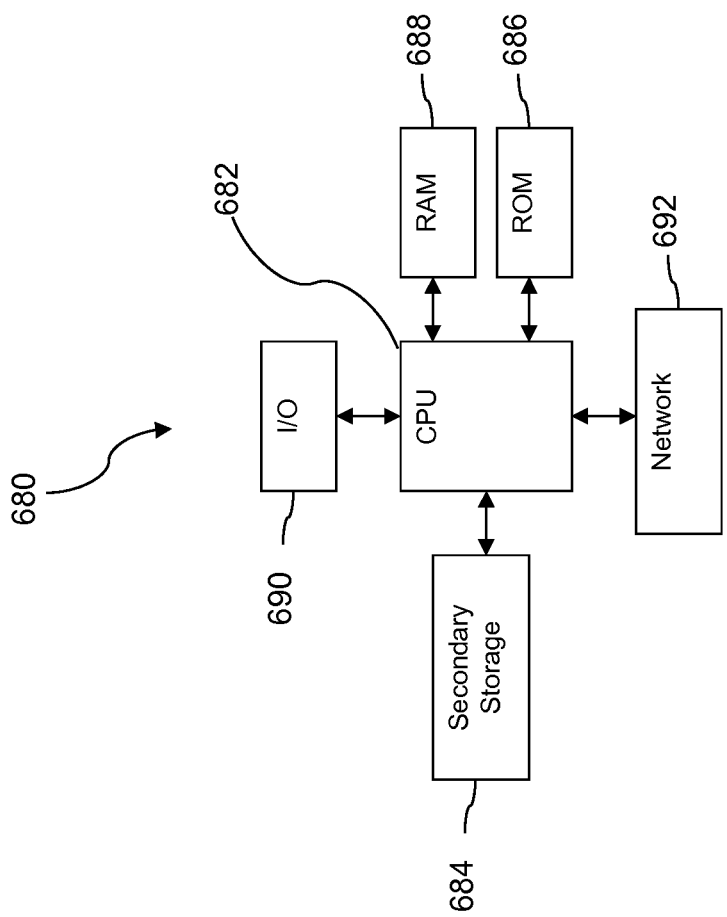
FIG. 14 is a block diagram of a computing system in accordance with various embodiments.

FIG. 14 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by executing software in a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 680 is turned on or booted, the CPU 682 may execute a computer program or application. For example, the CPU 682 may execute software or firmware stored in the ROM 686 or stored in the RAM 688. In some cases, on boot and/or when the application is initiated, the CPU 682 may copy the application or portions of the application from the secondary storage 684 to the RAM 688 or to memory space within the CPU 682 itself, and the CPU 682 may then execute instructions that the application is comprised of. In some cases, the CPU 682 may copy the application or portions of the application from memory accessed via the network connectivity devices 392 or via the I/O devices 690 to the RAM 688 or to memory space within the CPU 682, and the CPU 682 may then execute instructions that the application is comprised of. During execution, an application may load instructions into the CPU 682, for example load some of the instructions of the application into a cache of the CPU 682. In some contexts, an application that is executed may be said to configure the CPU 682 to do something, e.g., to configure the CPU 682 to perform the function or functions promoted by the subject application. When the CPU 682 is configured in this way by the application, the CPU 682 becomes a specific purpose computer or a specific purpose machine.

The secondary storage 684 is typically comprised of one or more storage drives (e.g., hard disk or solid state storage devices) or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684. The secondary storage 684, the RAM 688, and/or the ROM 686 may be referred to in some contexts as computer readable storage media and/or non-transitory computer readable media.

I/O devices 690 may include printers, video monitors, liquid crystal displays (LCDs), touch screen displays, keyboards, keypads, switches, dials, mice, track balls, voice recognizers, card readers, paper tape readers, or other input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 692 may enable the processor 682 to communicate with the Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 682 executes instructions, codes, computer programs, scripts which it accesses from hard disk, floppy disk, optical disk (these various disk based systems may all be considered secondary storage 684), flash drive, ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 684, for example, hard drives, floppy disks, optical disks, and/or other device, the ROM 686, and/or the RAM 688 may be referred to in some contexts as non-transitory instructions and/or non-transitory information.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage devices having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data structures in part by directly accessing the computer program product, for example by reading from a CD-ROM disk inserted into a disk drive peripheral of the computer system 680. Alternatively, the processor 682 may process the executable instructions and/or data structures by remotely accessing the computer program product, for example by downloading the executable instructions and/or data structures from a remote server through the network connectivity devices 692. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

In some contexts, the secondary storage 684, the ROM 686, and the RAM 688 may be referred to as a non-transitory computer readable medium or a computer readable storage media. A dynamic RAM embodiment of the RAM 688, likewise, may be referred to as a non-transitory computer readable medium in that while the dynamic RAM receives electrical power and is operated in accordance with its design, for example during a period of time during which the computer system 680 is turned on and operational, the dynamic RAM stores information that is written to it. Similarly, the processor 682 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A user equipment (UE), comprising:

a radio transceiver;

a processor coupled to the processor;

a storage device containing instructions which, when executed by the processor, cause the processor to:

load an application;

receive permissions for the application, wherein the permissions specify UE resources that the application is permitted to access;

receive a usage profile for the application, wherein the usage profile specifies how the application is to use the UE resources permitted by the permissions;

during execution of the application, compare operation of the application to the usage profile and generate an alert when the operation of the application is inconsistent with the usage profile;

suspend execution of the application in response to the operation of the application being inconsistent with the usage profile;

subsequent to suspending execution, receive a user input to authorize the operation of the application that is inconsistent with the usage profile; and discontinue the suspended execution of the application responsive to receiving the user input.

2. The UE of claim 1, wherein the radio transmitter is configured to receive the usage profile during the load of the application.

3. The UE of claim 1, wherein the usage profile specifies at least one of:

a data transmission rate through the radio transceiver;

a total amount of data to be transmitted through the radio transceiver; and frequency of use of a hardware resource of the UE.

4. The UE of claim 1, wherein, when executed, the instructions cause the processor to generate the alert when the operation of the application is inconsistent with the usage profile despite the operation of the application being consistent with the permissions.

5. The UE of claim 1, wherein the application executes within a secure container and secure container is configured to compare the operation of the application to the usage profile.

6. A user equipment (UE), comprising:

a radio transceiver;

a processor coupled to the processor; and a storage device containing instructions which, when executed by the processor, cause the processor to:

examine files in the storage device for a signature indicative of a branding element in use on the UE and that is associated with a wireless service no longer used by the UE;

upon detection of the signature in a file, perform a branding action on the file with the detected signature;

determine whether an application loaded on the storage device is operating consistent with permissions set for the application and with a usage profile for the application;

generate an alert in response to the operation of the application being inconsistent with the usage profile despite being consistent with the permissions;

suspend execution of the application in response to the operation of the application being inconsistent with the usage profile;

subsequent to suspending execution, receive a user input to authorize the operation of the application that is inconsistent with the usage profile; and discontinue the suspended execution of the application responsive to receiving the user input.

7. The UE of claim 6, wherein the permissions specify a resource that is permitted to be accessed by the application, and wherein the usage profile specifies at least one of a frequency of use of a resource, a data transmission rate, and a data amount.

8. The UE of claim 6, wherein in response to the operation of the application being inconsistent with the usage profile, the processor is configured to receive a user input indicating whether to authorize the operation of the application that is inconsistent with the usage profile.

9. The UE of claim 6, wherein the branding action includes at least one of:

removal of the detected signature;

replacement of the branding element corresponding to the detected signature with a different branding element;

deletion of the file in which the signature is detected; and quarantining the file in which the signature is detected.

10. The UE of claim 6, wherein the processor is configured to examine the files for each of a plurality of signatures.

11. The UE of claim 6, wherein a signature indicative of a branding element includes a signature indicative of at least one of: a logo, a text field, a customer care phone number, an audible tone, and an application.

12. The UE of claim 6, wherein the branding action includes:

suspending use of the file or removing the file with the detected signature from the UE, and replacing the file containing the detected signature with another file containing a new branding element that is associated with a wireless service in use on the UE.

13. The UE of claim 6, wherein the processor stores an identity of an examined file in a first list if that file is determined not to have the signature and, otherwise, stores the identity of the examined file in a second list if the file is determined to have the signature.

14. The UE of claim 6, wherein the storage device comprises a file identification storage that includes identities of files that are not to be examined for the signature, and, upon executing the instructions, the processor accesses the identities in the file identification storage and excludes such files corresponding to the identities during examination of files for the signature.

15. The UE of claim 6, wherein the signature comprises a predetermined sequence of bits.

* * * * *